(12) United States Patent
Feldman

(10) Patent No.: US 9,379,958 B1
(45) Date of Patent: Jun. 28, 2016

(54) USING DATA PATTERN TRACKING TO DEBUG DATAPATH FAILURES

(75) Inventor: Yael Feldman, Neve-Monoson (IL)

(73) Assignee: Cadence Design Systems, Inc., San Jose, CA (US)

( * ) Notice: Subject to any disclaimer, the term of this patent is extended or adjusted under 35 U.S.C. 154(b) by 888 days.

(21) Appl. No.: 13/153,563

(22) Filed: Jun. 6, 2011

(51) Int. Cl.
*H04L 12/26* (2006.01)

(52) U.S. Cl.
CPC ............... *H04L 43/50* (2013.01); *H04L 43/04* (2013.01)

(58) Field of Classification Search
None
See application file for complete search history.

(56) References Cited

U.S. PATENT DOCUMENTS

| 7,483,824 | B1* | 1/2009 | Hill | G01R 31/318357 438/14 |
| 7,673,031 | B1* | 3/2010 | Jalagam | H04L 67/1097 709/223 |
| 2007/0223388 | A1* | 9/2007 | Arad | H04L 1/24 370/252 |
| 2011/0261705 | A1* | 10/2011 | Kamerkar | H04L 12/2697 370/252 |

* cited by examiner

*Primary Examiner* — Ian N Moore
*Assistant Examiner* — Phong La
(74) *Attorney, Agent, or Firm* — Rosenberg, Klein & Lee

(57) ABSTRACT

A method and system are provided for profiling data packets as they flow along a datapath in a device under test to locate and debug problems with the datapath or the individual nodes constituting the datapath to thereby expedite formal verification of a device under test and resolve any problems found.

23 Claims, 10 Drawing Sheets

| Data Items – Legend | |
|---|---|
| Index | Name |
| 1 | cdn_pkt_burst@12 |
| 2 | cdn_pkt_burst@16 |
| 3 | cdn_pkt_burst@67 |
| 4 | cdn_pkt_burst@21 |
| 5 | cdn_pkt_burst@2 |
| 6 | cdn_pkt_burst@14 |

FIG.2-1

USING DATA PATTERN TRACKING TO DEBUG DATAPATH FAILURES

BACKGROUND OF THE INVENTION

1. Field of the Invention

The present invention is generally directed to a method and system for using data pattern tracking to debug datapath failures. More specifically, the present invention is directed to a method and system of tracking and profiling tagless data objects by their respective values while accounting for transformations to the values as the data objects travel through datapaths of a system to thereby locate and debug problems with the system, components, and datapaths in an efficient and automated manner.

2. Description of the Related Art

In integrated circuit (IC) design, it is of paramount importance to be able to quickly, easily, and inexpensively ascertain whether there are flaws with a design, locate those flaws within the design, debug, and resolve such flaws. Generally, each circuit or design may be represented as a Device Under Test (DUT) as a database or computer readable file representing the layout and/or schematic of the circuit or design. This computer readable file representing the device under test (DUT) is run through many simulations to verify that it performs as intended. Conventionally, this DUT would undergo a comprehensive battery of tests using pseudorandom or random constrained inputs and checking to determine whether the outputs were in accord with the inputs.

If it was determined that a given output was in an unexpected state, then the engineer or designers would have to evaluate the system comprehensively and in a painstaking manner—inspecting, tracing, and generally attempting to determine where the problem occurred and what, exactly, was the problem. Such a debugging effort could potentially implicate multiple disciplines at multiple sites, bringing together multiple engineering/design/debug teams as datapaths often cross many different and disparate components. Multiple teams would need to be assembled having expertise in each of the elements along the potential datapath where the problem may have occurred. Forcing these engineers of different disciplines to collaborate to resolve each issue requires a lot of time, effort, expense, and coordination.

Another method conventionally used in concert with such a debug effort has been to introduce a tagging means to tag or incorporate unique identifiers for each packet. Such a tag may be implemented in metadata. However, the use of metadata and tags to label items during evaluation would require extensive modifications to code, additional overhead, and may introduce additional unwanted problems. It may also require modification of the DUT itself to accommodate the tagging. The modified DUT would then require subsequent removal of the modifications performed to accommodate the tagging, a reversion to unmodified code, and a separate re-verification on the unmodified DUT.

There is therefore an urgent need for a method and system for using data pattern tracking to debug datapath failures without tagging or otherwise modifying data objects.

There is therefore a need for a method and system for automatically tracking the data pattern of data objects as they traverse through datapaths of the system to thereby quickly locate problems within a circuit, design, device, or network.

SUMMARY OF THE INVENTION

An object of the present invention is to provide a system and method for using data pattern tracking to debug datapath failures.

Another object of the present invention is to provide a system and method for automatically tracking data patterns of data objects as they traverse through nodes of the datapaths of the system.

Another object of the present invention is to provide a system and method for aiding in the debugging of datapath failures.

Another object of the present invention is to provide a system and method for locating a source of data corruption along a datapath.

It is yet another object of the present invention to provide a system and method for ensuring data integrity throughout a datapath.

It is yet another object of the present invention to provide a system and method for identifying likely transformations to a data pattern of a data packet.

These and other objects are attained by a method and system implemented in accordance with the present invention.

A method of profiling travel of transforming data packets through a system includes: establishing a system having at least one data path defining transmission of a data packet therethrough including an origin, a destination, and at least one intermediate node. A characteristic data pattern of a target data packet and a set of anticipated transformations of the characteristic data pattern of the target data packet are identified. A data packet at a destination and an intermediate node according to the characteristic data pattern and said set of anticipated transformations are captured. The data packets captured from at least the destination and the intermediate node are graphically displayed.

Another exemplary embodiment provides a method of non-invasively tracking the travel of transforming data packets through a system includes: establishing a system having at least one data path defining transmission of a data packet therethrough including an origin, a destination, and at least one intermediate node. A characteristic data pattern of a target data packet is identified. An adaptive search to qualitatively identify a data packet with a transformed data pattern as being the target data packet is executed. The transformed data pattern of the data packet at the destination and the at least one intermediate node is captured. The data path traveled and the captured data pattern of the data packet at each node along the data path including at least the destination and the at least one intermediate node is displayed.

Yet another exemplary embodiment provides a system for profiling travel of transforming data packets through a circuit including: a processor, a storage memory coupled to the processor via a bus, and an origin node. A destination node is operatively coupled to the origin node via a data path having at least one intermediate node disposed between the origin node and the destination node. A data pattern generator is operable to generate an orthogonal data pattern and populate a data packet with the orthogonal data pattern. A search module is operable to adaptively identify the data packet having a transformed data pattern. A capture module is operable to capture the data patterns of the data packet at plural nodes along the data path including the destination and the at least one intermediate node. A mapping module is operable to display the captured data patterns of the data packet occurring at each of the plural nodes along the data path.

Yet another exemplary embodiment provides a system for profiling travel of transforming data packets through a data path and includes at least one data path defining transmission of a data packet therethrough including an origin, a destination, and at least one intermediate node. A search module is included and is operable to identify a characteristic data pattern of a target data packet and a set of anticipated transformations of the characteristic data pattern of the target data packet. A capture module is also included and is operable to capture a data packet at a destination and an intermediate node according to the characteristic data pattern and the set of anticipated transformations. A mapping module is also included and is operable to graphically display the data packet captured from at least the destination and the intermediate node.

BRIEF DESCRIPTION OF THE DRAWINGS

FIGS. 2, 2-1, and 2A are exemplary screen shots of a user interface of the system for using data pattern tracking to debug datapath failures in accordance with an exemplary embodiment of the present invention;

DETAILED DESCRIPTION OF THE PREFERRED EMBODIMENTS

In the design and implementation of integrated circuits, it is essential to accurately and inexpensively locate and debug problems within a circuit design. Typically, circuit designers and engineers faced with an unexpected output from a circuit would be forced to perform a long, expensive, and inefficient process of debugging—potentially even requiring multiple different teams of different disciplines of engineers to debug, locate, and identify the problem. Modern integrated circuits, networks, or devices, may have many thousands of components with potentially thousands of datapaths, and often, the only indication of a problem or a bug is that the output is unexpected as compared to the input. Determining what went wrong and why the output is not as expected, is a very difficult and time consuming process involving collaboration between potentially hundreds of different engineers in different fields working with different components of the overall integrated circuit, network, or device. Such a time consuming, error-prone, and workforce-intensive process of arriving at the problem is compounded inasmuch as circuit design is an iterative process and once a revision has been made, another verification must be made and upon discovery of more problems, the entire process repeats.

In accordance with an embodiment of the present invention, a system and method for using data pattern tracking to debug datapath failures is provided. In broad concept, a specific target data packet input into a device under test (DUT) is identified by its characteristic data pattern. A set of transformations of the characteristic data pattern that are deemed likely to occur or be found in the DUT are computed. For example, if the DUT is known to have components of differing communications protocols, or using differing endian ordering, or is likely to perform bit shifts, then the characteristic data pattern is modeled in the different protocols, endian orders, and/or shifts . . . etc. Data packets having or closely matching the characteristic data pattern and/or modeled transformations thereof are then searched for throughout the DUT. Each occurrence of a data packet found having a data pattern that resembles the data pattern of the target data packet (accounting for transformations) is then displayed. A graphical display of a determined data path actually traveled by the target data packet is rendered showing to a user the components of the DUT that the target packet actually traversed and the data pattern of the target packet at each component or node. Optionally, timing information relating to when the target packet traversed each component is displayed. Further, selective color coding is employed to graphically show a user similar data packets to ease in identification of problems with the DUT.

Figure 1:
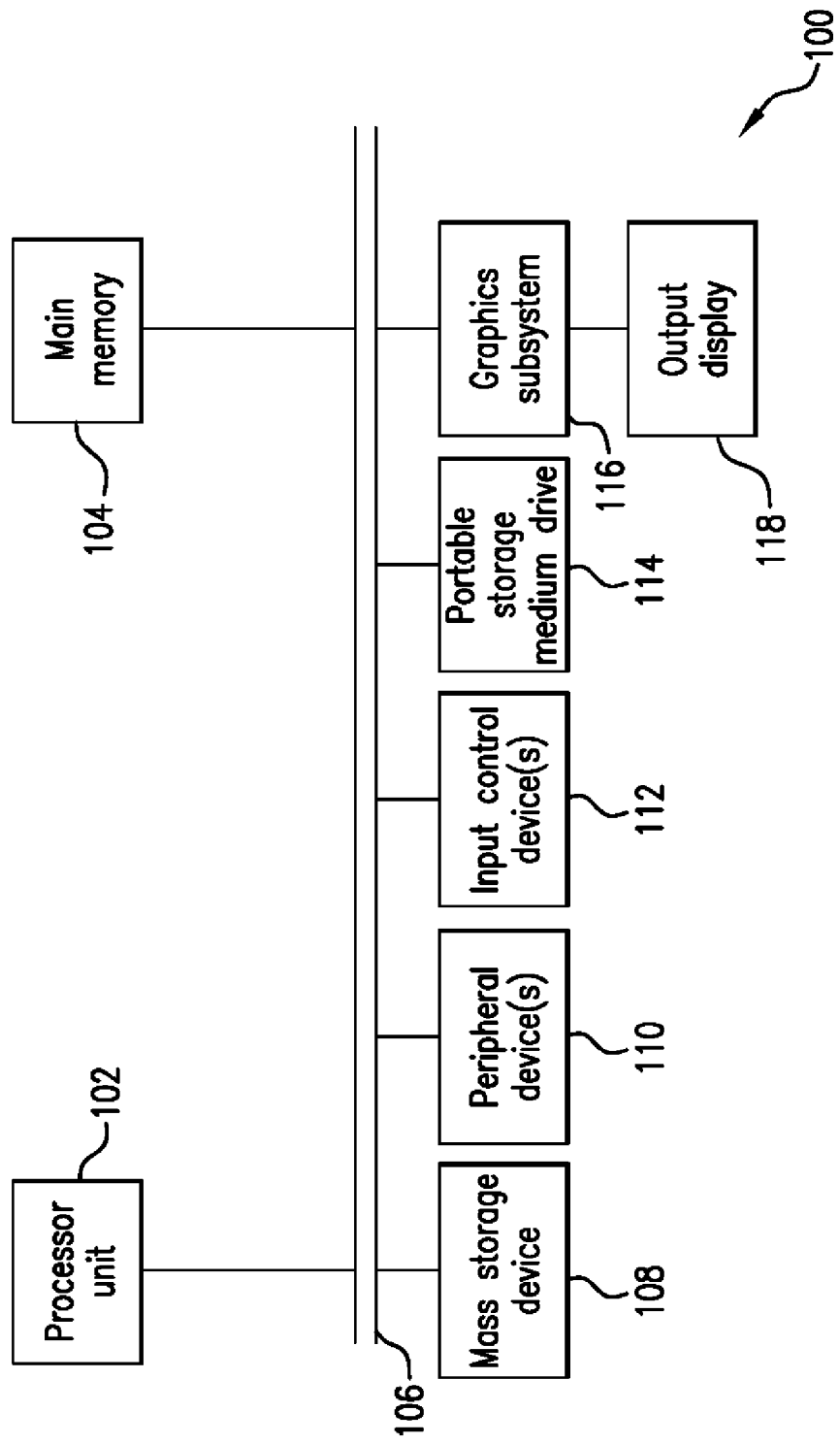
FIG. 1 is a schematic diagram of a system in accordance with an exemplary embodiment of the present invention.

FIG. 1 illustrates a block diagram of a computer system for executing electronic design automation (EDA), integrated circuit verification, and data pattern tracking to debug datapath failures in accordance with various embodiments of the present invention. A computer system 100 contains a processor unit 102, a main memory 104, an interconnect bus 106, a mass storage device 108, peripheral device(s) 110, input control device(s) 112, portable storage drive(s) 114, a graphics subsystem 116, and an output display 118. Processor unit 102 may include a single microprocessor or a plurality of microprocessors for configuring computer system 100 as a multi-processor system. Main memory 104 stores, in part, instructions and data to be executed by processor 102. Main memory 104 preferably includes banks of dynamic random access memory (DRAM) as well as high-speed cache memory.

For the purpose of simplicity, the components of computer system 100 are connected via interconnect bus 106. However, computer system 100 may be connected through one or more data transport measures. For example, processor unit 102 and main memory 104 may be connected via a local microprocessor bus and mass storage device 108, peripheral device(s) 110, portable storage medium drive(s) 114, and graphic subsystem 116 may be connected via one or more input/output (I/O) buses. Mass storage device 108, which may be implemented with a magnetic disk drive, an optical disk drive, a solid state device, or an attachment to network storage, is non-volatile storage device for storing data, databases, and instructions, to be used by processor unit 102. In a software embodiment, mass storage device 108 may store the software to load it into main memory 104.

Portable storage medium drive 114 operates in conjunction with a portable non-volatile storage medium such as a floppy disk, a compact disk read only memory (CD-ROM), or a digital versatile disk read only memory (DVD-ROM), to input and output data and code to and from the computer system 100. In one embodiment, the software is stored on such a portable medium, and is input to computer system 100 via portable storage medium drive 114. Peripheral device(s) 110 may include any type of computer support device such as an input/output (I/O) interface, to add additional functionality to computer system 100. For example, peripheral device(s) 110 may include a network interface card to interface computer system 100 to a network.

Input control device(s) 112 provide a portion of the user interface for a computer system 100. Input control device(s) 112 may include an alphanumeric keypad for inputting alphanumeric and other key information; and a cursor control device such as a mouse, a track pad or stylus; or cursor direction keys.

In order to display textual and graphical information, computer system 100 contains graphic subsystem 114 and output display(s) 118. Output display 118 may include a cathode ray tube (CRT) display, liquid crystal display (LCD), plasma, projector, or active matrix organic light emitting diode (AMOLED) display. Graphic subsystem 116 receives textual and graphical information and processes the information for output to display 118.

In a software implementation, the EDA software includes a plurality of computer executable instructions, to be implemented on a computer system. Prior to loading in the computer system, the EDA software may reside as encoded information on a computer-readable tangible medium such as a magnetic floppy disk, a magnetic tape, CD-ROM, DVD-ROM, flash memory, or any other suitable computer readable medium.

Figure 6:
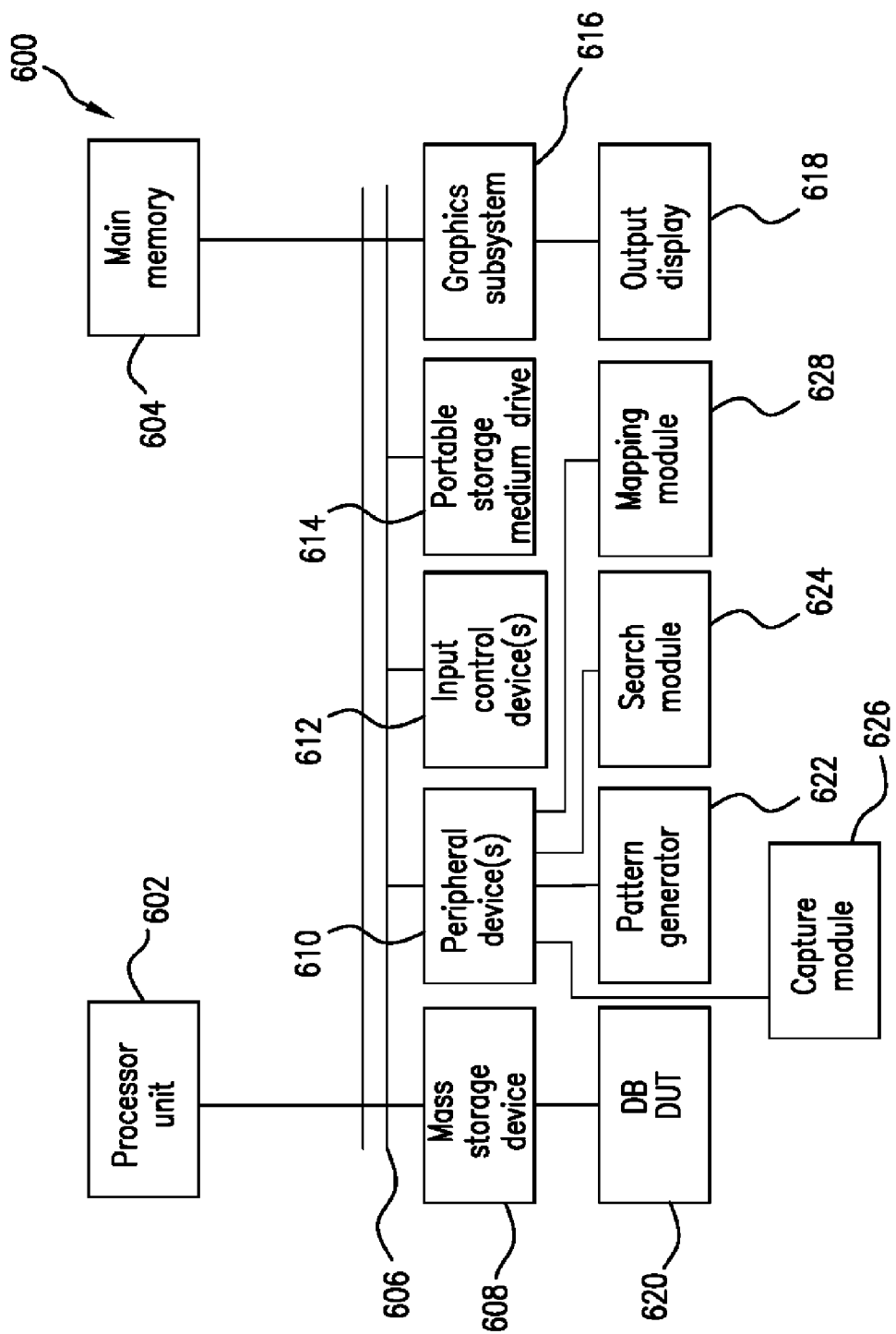
FIG. 6 is a schematic diagram of a system in accordance with another exemplary embodiment of the present invention.

In a hardware implementation, such a system may be implemented in any suitable computer based platform known in the art. For example, the system may comprise suitable storage media and one or more dedicated processors or share one or more processors executing/controlling other functions, wherein the employed processor(s) is programmably configured with processor instructions for performing the functions described herein. Suitable circuits may also be developed to execute certain aspects of these functions. FIG. 6 shows one such exemplary hardware implementation.

Figure 2:
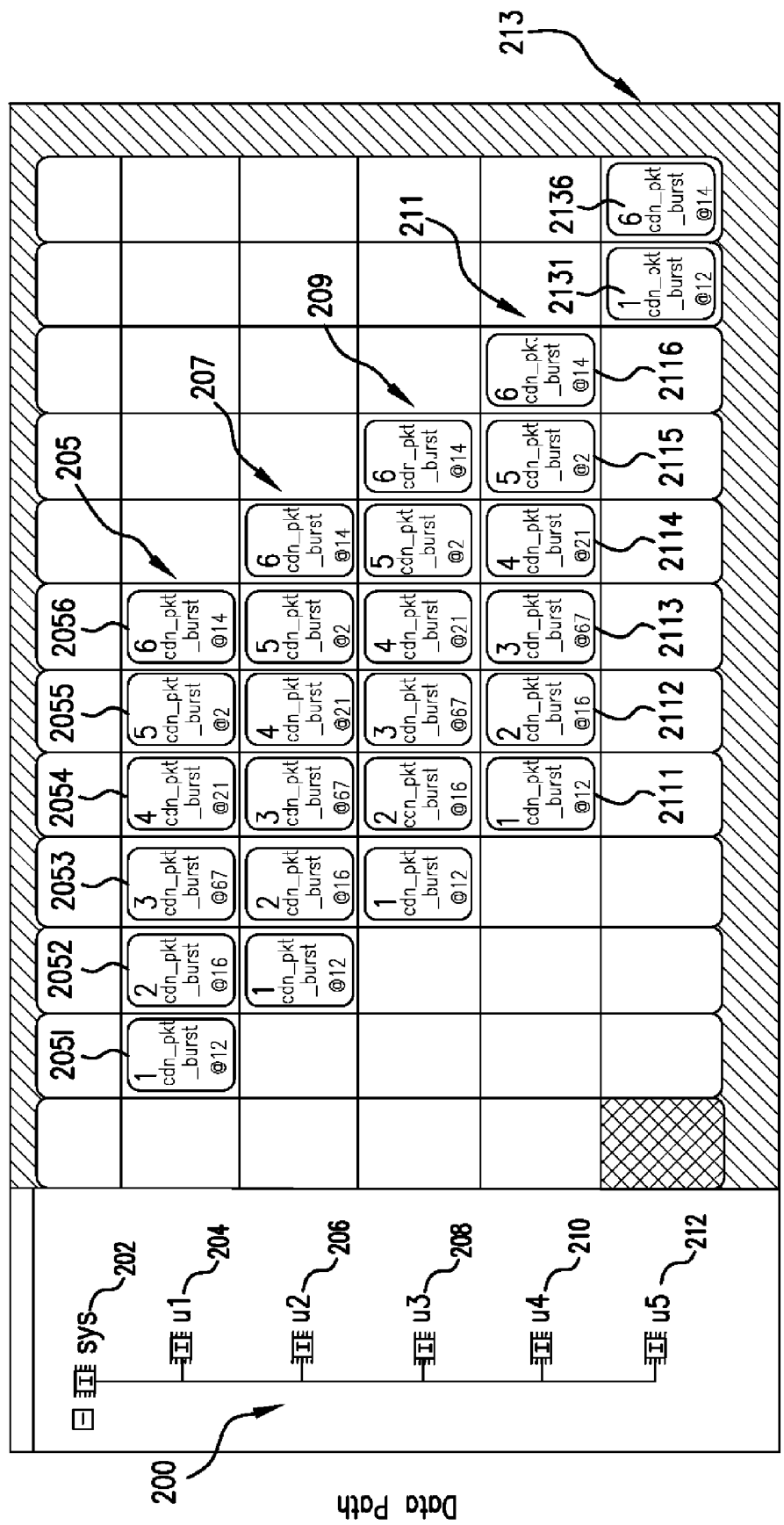

FIG. 2 is a simplified exemplary screenshot of a datapath map with timing information in accordance with various embodiments of the present invention. A datapath 200 illustrates a system 202 having a plurality of nodes 204, 206, 208, 210, and 212. The nodes, points, sites, components, modules, elements, chips, or links (used interchangeable herein) may illustrate a datapath or a path for a signal or data packet to travel traversing from an origin element 204 and then on to element 206 to element 208, to element 210, and finally, to a destination element 212.

Traditionally, a circuit or network designer looking at the output as it arrives at a node 212 may notice that the data packet, signal, or data object (used interchangeably herein) did not arrive as expected. The designer may then investigate back at the origin 204 to ensure that the origin 204 had an expected data value or packet and that it was indeed transmitted out successfully, but it would then be up to the designer to determine the data path taken and interrogate each of the nodes (including both software and hardware) or elements in the datapath to ensure that the data arrived and was transmitted as intended at each node. Such a process is typically very complicated and very expensive in terms of time, labor, and computing power.

In a preferred embodiment, system 202 is a computer representation of a Device Under Test (DUT), for example a computer, an integrated circuit, a network, or the like. During the verification stage of testing the DUT, a large number of random numbers are typically generated and input into the origin or node 204 to traverse through 206, 208, 210, and arrive at element 212. To ensure that the system is working as expected, these random data values are input into element 204 and the output is monitored at element 212 to ensure that the output values conform to the expectations and the definitions of the system.

If the output does not conform to the expected values, then a problem may be inferred to exist. In this preferred embodiment, all of the data values of each of the nodes 204-212 are monitored and recorded throughout the simulation time.

Upon the occurrence of a data error, or the receipt of an unexpected value, a user may be presented with a map or a graph as shown in FIG. 2, wherein the data pattern of a data packet travelling from 204 is shown in each of the respective links or nodes. As is seen in FIG. 2, at the destination 212, the data pattern of the data packet has dramatically changed. The data pattern of the data packet 213 at element 212 now encompasses only a first element 2131 and the second element 2136. Tracing backwards and upwards in time, it is seen that at each of the previous links 210, 208, 206, and 204, the data pattern of the data packets 205, 207, 209, and 211 each encompassing elements 1-6, respectively labeled as 2051, 2052, 2053, 2054, 2055, and 2056 at link 204. What can be discerned from this is that the unique orthogonal or randomly generated data pattern of the data packet 205 originated at link 204 and traversed through each of the respective links in its entirety, including all six constituent elements of the datapath, until link 210. Somewhere between link 210 and link 212, a data corruption, a data drop, an overtake, or a data collision occurred, resulting in the loss of packets 2-5 (2112-2115).

A system designer or circuit designer looking at FIG. 2 would likely be able to eliminate, as cause for concern, links 204-210 and be able to focus their efforts on the link between element 210 and element 212. It is important to keep in mind that FIG. 2 is merely a very simplified abstraction of a data path within a system and a rendered map of the flow of the data therethrough. Eliminating elements or nodes 204-210 may indeed save considerable debugging time and may indeed eliminate the need to bring in a cross-discipline debugging effort. If each node 204-210 is a specialized component in an overall system, it may indeed be that an entire team of engineers deals with each respective node. Accordingly, by eliminating links 204-210 as causes of concern, personnel may be freed from the burden of the debug effort and able to continue with more productive tasks.

Not only is the location of a fault able to be determined, but also, the nature of the fault or problem may be discerned using a system and method in accordance with this embodiment of the invention. As opposed to the conventional error message being returned on a fault, the preferred embodiment may indeed provide enough information in a usable form such that an engineer or designer of the integrated circuit, system, or network may be aided in discerning the nature of the problem. As seen in FIGS. 2 and 2-1, data items 1 and 6 (2131 and 2136 respectively) representing data item 214 and data item 224 (omitting data items 216-222) may signify to one of skill in this particular art that a buffer overrun has occurred.

In a preferred embodiment, when a data packet does not arrive as expected, an error message may be generated. The error message may be configured to specifically cite the problem, for example, a data pattern did not match an expected pattern: e.g. "Data mismatch: expected 0xab654321 actual 0xab654300," or that a packet did not arrive where expected: e.g. "Packet @-3 did not arrive at port 3." In such an event, the data value cited in the error message may form the basis of the fuzzy search throughout the system. Alternatively, the location of expected receipt of the data packet may automatically be extracted and considered in the formation of a search throughout the system for the data packet.

Figure 2A:
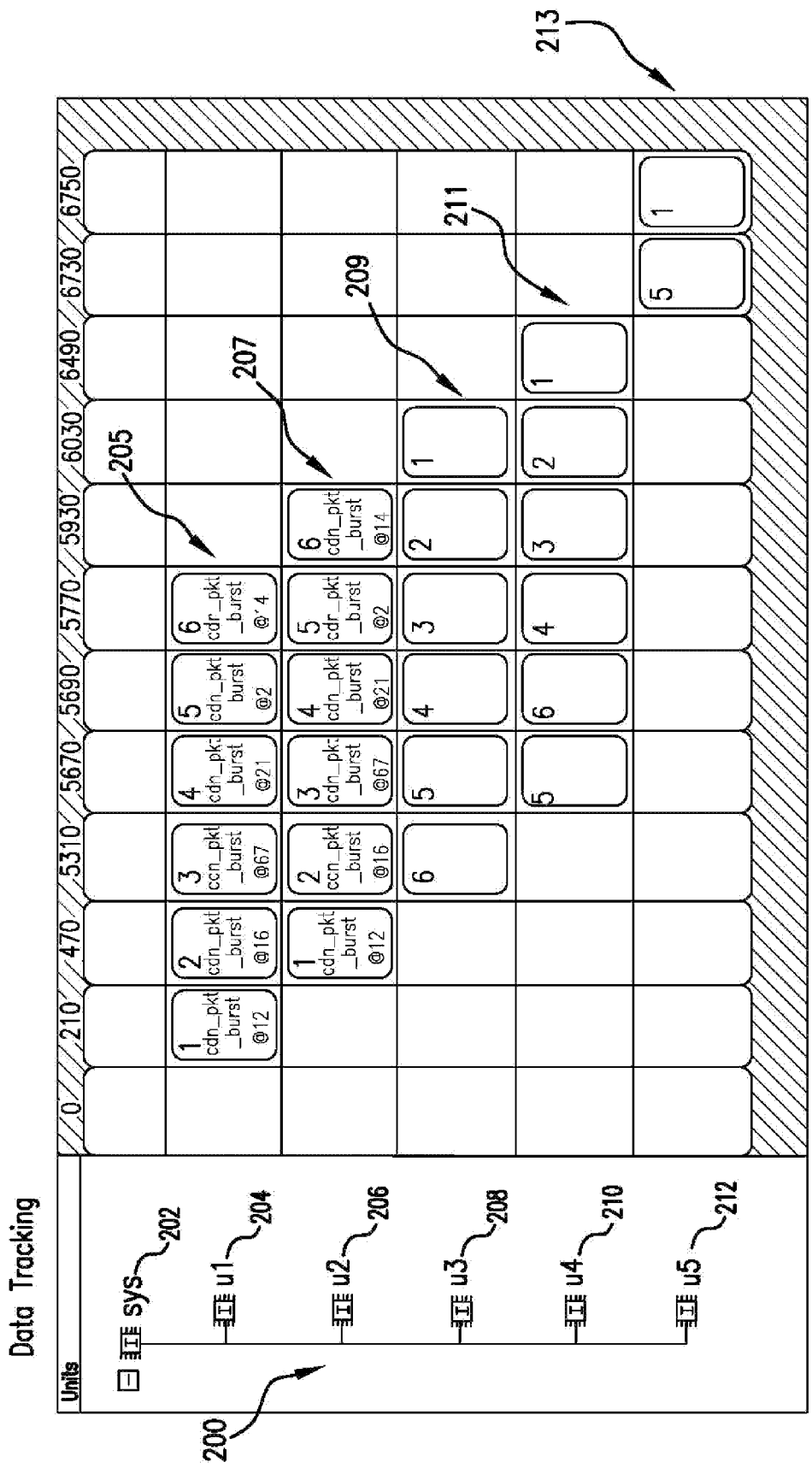

FIG. 2A is another illustrative screenshot generated in an exemplary embodiment of a system or method in accordance with the present invention. In FIG. 2A, however, the data pattern of data packet 205 has been transformed, transposed, modified, computed, or processed (used interchangeably herein). In this instance, the data pattern of subsequent data packet 207 in this example has merely been reversed into a backwards order, as seen in the data pattern of packet 209.

Such a known transformation is merely a simplified example of known and common transformations of data. Many such known or common transformations of data are performed numerous times throughout a data path of a system or circuit. In the instant example, it would appear as if the data packet 207 having an arrangement: 1, 2, 3 . . . 6 has been transformed between a big endian and a small endian format where the order of bits is reversed. Many other type of known transformations such as a shift, a division, a multiplication, a mod, or a truncation may indeed be performed on any given data packet as it flows through a datapath of the system.

While data packet 205 was instantiated with an initial and orthogonal data pattern at node 204, in its traversal down to element or node 212, a series of operations and/or transformations may indeed be performed. The instant system does not use a tagging method of keeping track and observing the flow of a particular data packet through the system, as such would be unwieldy, tagging every single data packet would be incredibly expensive in terms of storage space, processing power, and management such that it is impractical. Instead, in the preferred embodiment of a simulator of a device under test, that device under test has a massive amount of tagless random data packets generated and input. Inasmuch as the randomization can be assumed to result in a high degree of orthogonality, the present approach attempts to profile and monitor the flow of a given data packet through the system by monitoring its inherent value as opposed to a tagged name. Monitoring the flow of a data packet through the datapath of a system becomes progressively more difficult as the data packet changes, is operated upon, and is transformed through the different nodes of the datapath.

Obviously, a system where the individual data packets are irrevocably tagged, named, or have an external or extensible metadata identifying them as the packet of interest, would be overwhelmingly easier to monitor as it progressed throughout the system. In contradistinction, the instant Patent Application uses no data tagging or metadata to identify the individual packet of interest, but rather looks to the inherent value in each packet, accounting for transformations, mutations, and permutations. One measure employed to locate a changing and evasive packet such as the ones being monitored, e.g., 205, is to use a fuzzy search algorithm. For example, a given data packet may be comprised of 1,000 bits and a candidate that we may be attempting to determine whether it is or is not the instant packet of interest, may only have 990 identical bits to the 1,000 bit string that we are searching for. In such a case, taking into account the heuristics and knowledge of the particular system under test, it may be commonplace that 900 bits in common with the 1,000 bit string may indeed be enough to identify with reasonable accuracy that the candidate packet is indeed the packet of interest that we are searching for. Another means of locating a transformed, modified, mutated, or permutated data packet may be to search also for known mutations or permutations of the data packet having a high probability occurring along a given data path. For example, potentially instead of just searching for the string 1, 2, 3, . . . 6, as the endian order switch may indeed be a transformation likely to occur within the particular device under test, the fuzzy search may indeed be expanded to also include the data pattern of 6, 5, 4, 3, . . . 1.

Data packet 211 shows a further transformation, the shifting of the order of the first two bits 5 and 6. At some point after leaving node 210, data packet 211 appears to suffer a packet loss resulting in a data packet 213 that is missing elements 2-4 and 6.

Figure 3:
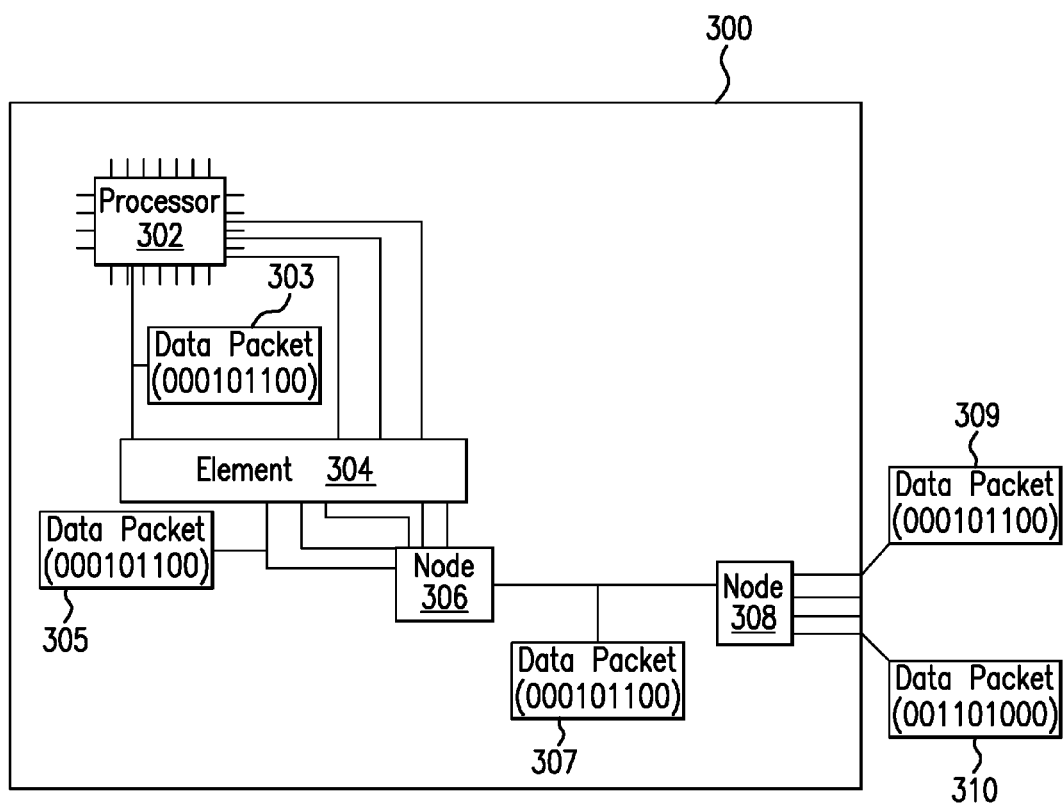
FIG. 3 is a simplified schematic diagram of a system for using data pattern tracking to debug datapath failures in accordance with another exemplary embodiment of the present invention.

FIG. 3 is a simplified schematic of a system for using data pattern tracking to debug datapath failures. A processor 302 within a system 300 may send out a data packet 303 having a particular data pattern consisting of zeros and ones, hexadecimal numbers, ANSI strings, or any known variable type may be employed. The data packet 303 traverses from processor 302 to an element 304 which may be a memory location or a storage location, or an operating node, a register, a shift, . . . etc. Data packet 303 may or may not undergo a transformation, permutation, or mutation in node 304.

Once node 304 has successfully received data packet 303, it may then either store, or just immediately forward data packet 305 onto another node 306. Node 306 may then transfer the data packet 307 onto the next node 308. Node 308 then may output one or a plurality of data packets, one of which may be data packet 309 which has a preserved data pattern of the data packet 303. Similarly, node 308 may also simultaneously output a reversed order data packet 310 having a reversed order of the data pattern, such as a reverse endian transformation to be output to another system network or module. In traditional systems, it is only at this point that a flag may be thrown that the output is not as expected; whereas, in the instant Application, each of the nodes 302, 304, 306, and 308 each are interrogated and the data pattern of the data packet as it passes through each of the nodes is recorded such that when there is a data corruption or data loss, the point at which that happened may be easily ascertained so as to more quickly, efficiently, and inexpensively remedy the problem.

Figure 4:
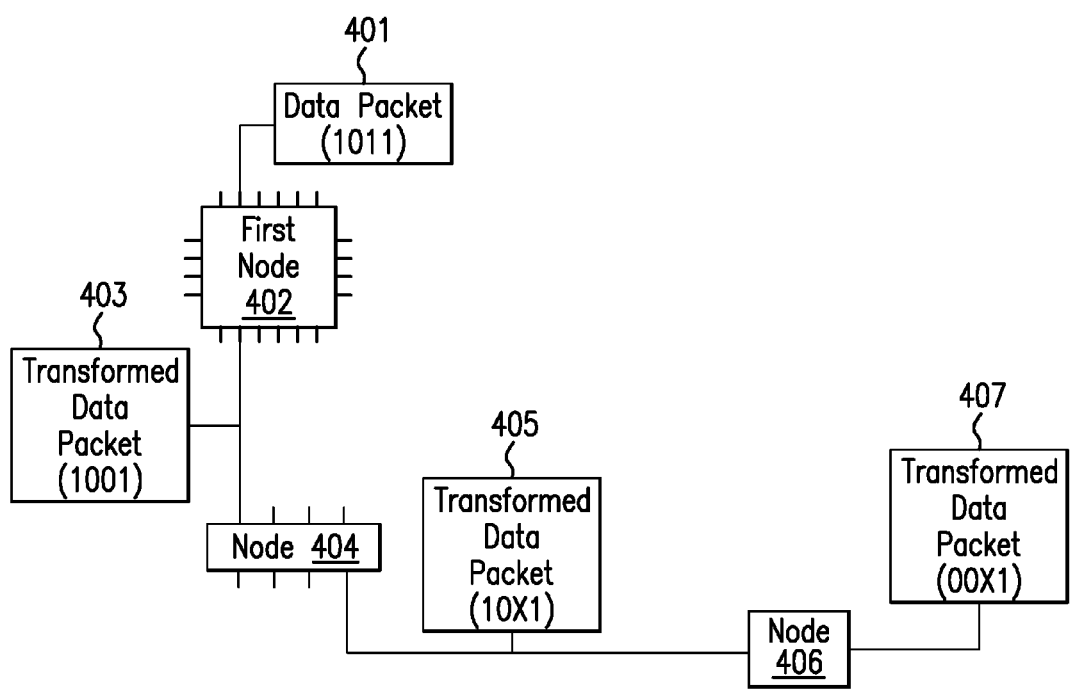
FIG. 4 is a flow diagram of a method for using data pattern tracking to debug datapath failures in accordance with another embodiment of the present invention.

FIG. 4 is another simplified schematic of the system for using data pattern tracking to debug datapath failures. A data packet 401 having a particular data pattern in binary bits is seen being fed into the input line of a first node 402 (which may be a processor) and emerging from node 402 is data packet 403 having a transformed data pattern of binary bits. The transformation may be one of a shifting or a multiplying or any other transformation known to one of skill in the art. The transformed data packet 403 travels down to node 404 as input and as an output from node 404 to node 406. As data packet 405 travels from node 404 to 406, or even during its stay at node 404, it appears that the data pattern has changed and one of the bits may have entered an unknown state.

Even though the data packet 405 has had its data pattern transformed multiple times and a bit of corruption has entered the data packet pattern, such a data pattern may still be found through a qualitative evaluation and an adaptive search of the data packets in the system during an attempt to identify the original data packet 401 as it traverses through the datapath defined by the path of node 402, 404, 406 . . . etc. Node 406 then is seen outputting a further transformed data packet 407. Such a data packet having undergone extensive transformation throughout the datapath may, or may not, be found using an adaptive or fuzzy search inasmuch as the pattern has transformed extensively. One of ordinary skill in the art may determine the amount of fuzziness of the search, for example, to return resulting packets having anywhere from 20-100% matching pattern or permutation of the pattern mutation, or combination of patterns matching to a certain threshold of the searched pattern. Considerations that go into that would be the amount of processing time, the amount of packets to be searched, the resiliency to false positives, and the consequences of a missed packet if the search was overly narrow or restrictive such that it avoided a needed packet.

Figure 5:
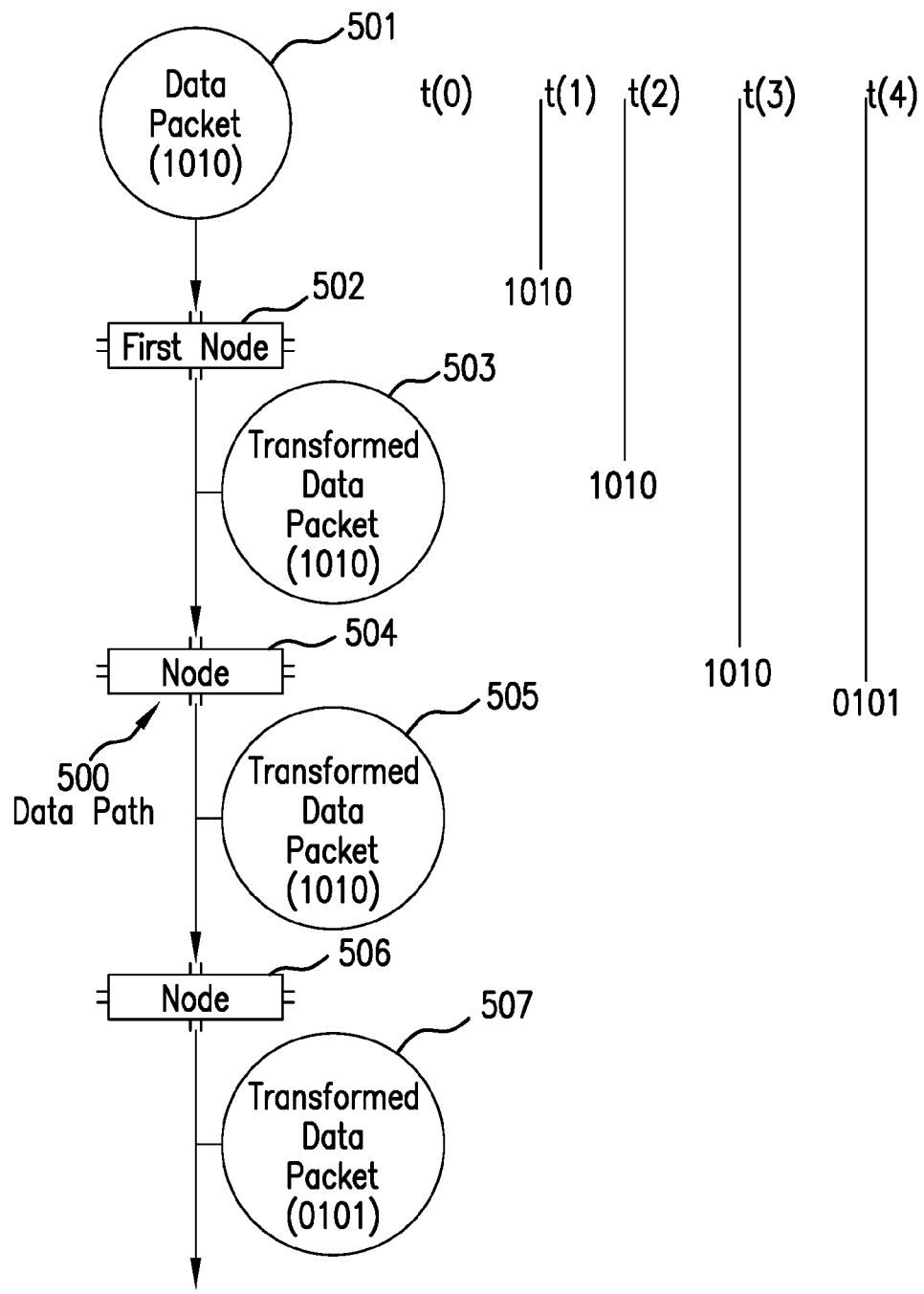
FIG. 5 is a simplified flow diagram including timing information of a method for using data pattern tracking to debug datapath failures in accordance with an embodiment of the present invention.

FIG. 5 is another simplified schematic of a system for using data pattern tracking to debug datapath failures. FIG. 5 shows another simplified example of a datapath 500 starting with a data packet 501 being input into a first node 502 and then traversing through a series of nodes 504, 506 . . . etc. and the resultant data patterns of the traversing data packet as it is transformed 503, 505, and ending in 507.

FIG. 6 is another simplified schematic of a system for using data pattern tracking to debug datapath failures in accord with an embodiment of the instant application. FIG. 6 illustrates a block diagram of a computer system for executing electronic design automation (EDA), integrated circuit verification, and data pattern tracking to debug datapath failures in accordance with various embodiments of the present invention. A computer system 600 contains a processor unit 602, a main memory 604, an interconnect bus 606, a mass storage device 608 which may include a Device Under Test (DUT) Database (DB), peripheral device(s) 610, input control device(s) 612, portable storage drive(s) 614, a graphics subsystem 616, and an output display 618. Main memory 604 stores, in part, instructions and data to be executed by processor 602. For the purpose of simplicity, the components of computer system 600 are connected via interconnect bus 606. Peripheral device(s) 610 may include a pattern generator 622 which may generate random or orthogonal data patterns to populate data packets; search module 624 operable to search for a particular value within a data packet throughout a system, potentially employing fuzzy search strategies; capture module 626 operable to capture a data pattern of a data packet throughout a data path; and mapping module 628 operable to render and display changing data pattern information of the data packets as they traverse data paths of the system 600.

Input control device(s) 612 provide a portion of the user interface for a computer system 100 user. Input control device(s) 612 may include an alphanumeric keypad for inputting alphanumeric and other key information; and a cursor control device such as a mouse, a track pad or stylus; or cursor direction keys.

In order to display textual and graphical information, computer system 600 contains graphic subsystem 614 and output display(s) 618. Graphic subsystem 616 receives textual and graphical information and processes the information for output to display 618.

Figure 7:
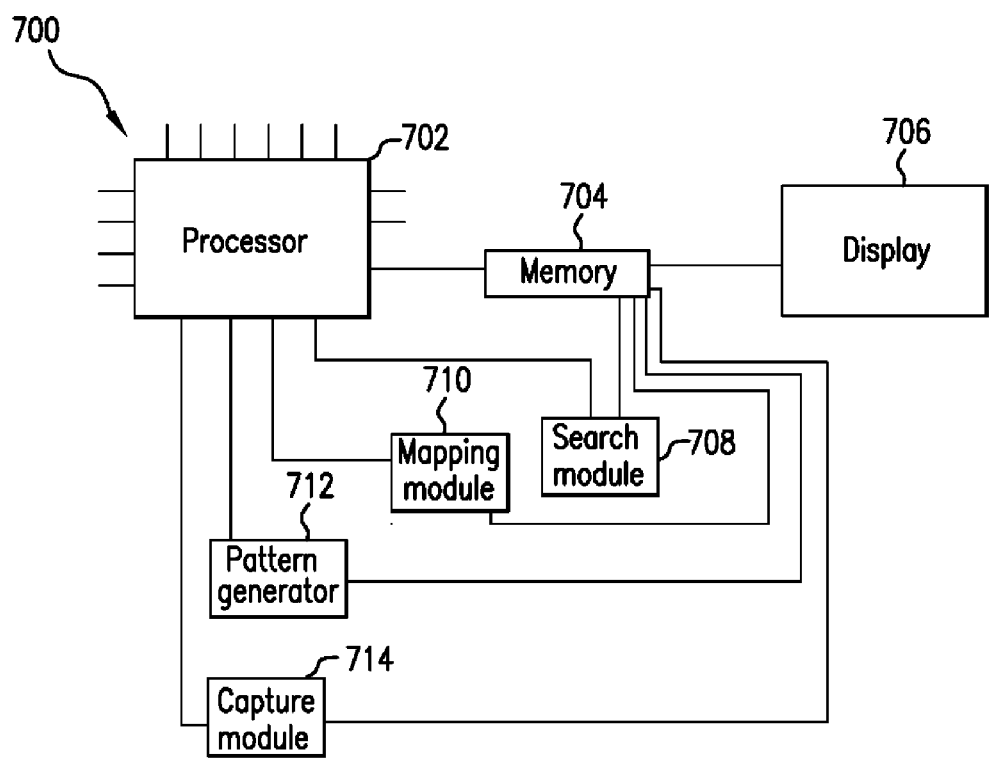
FIG. 7 is a schematic diagram of a system in accordance with another exemplary embodiment of the present invention.

FIG. 7 is another simplified schematic diagram of a system using data pattern tracking to debug datapath failures. A computer system 700 includes processor 702, memory 704, display 706, and a search module 708, a mapping module 710, a pattern generator 712, and a capture module 714, each coupled to the processor 702 and memory 704. Alternatively, such a system may indeed have the search module 708, mapping module 710, pattern generator 712, and capture module 714 disposed within processor 702.

Figure 8:
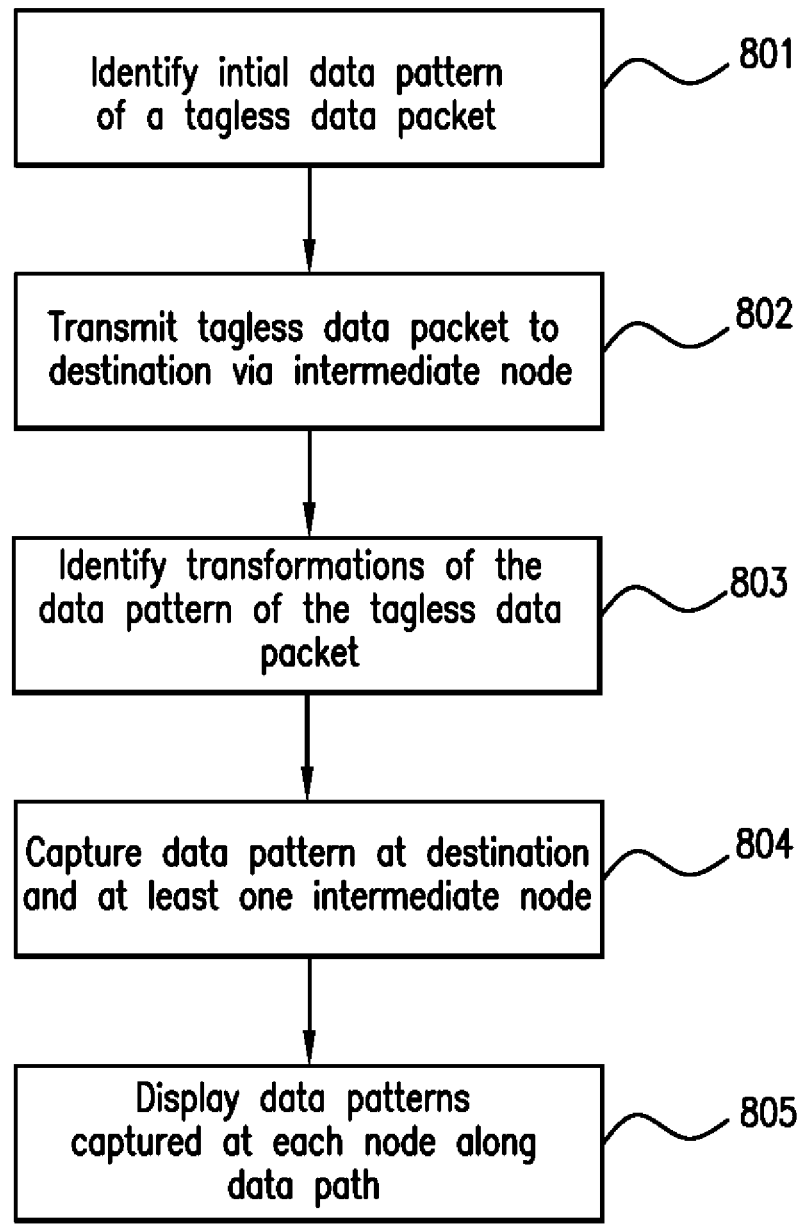
FIG. 8 is a simplified flow diagram of a method for using data pattern tracking to debug datapath failures in accordance with an embodiment of the present invention.

FIG. 8 is another simplified flow diagram of a method for using data pattern tracking to debug datapath failures. At step 801, an initial data pattern of a tagless data packet that may be anticipated to be transformed throughout a datapath will be identified.

At step 802, the tagless data packet will be transmitted from the origin to the destination via at least one intermediate node.

At step 803, an identification of likely transformations of the data pattern of the tagless data packet will be recorded. As the data packet has not been tagged, is not encapsulated in an outer layer of metadata or in any sort of identifying value, we are relying on the intrinsic value—the value or payload of the data packet. As that data packet flows through a datapath, the data pattern or value of the data packet is likely to undergo a transformation. Some transformations to be anticipated may include endian: transforms between big endian and small endian, among others.

At step 804, the data pattern of the data packet is captured at each of the destination and at least one intermediate node throughout the datapath. Such capture may be performed by performing a fuzzy search for both the original or initial data pattern and/or likely transformations of the initial data pattern.

Lastly, at step 805, the data patterns that were captured at each of the destination and at least one intermediate node along the datapath are displayed in relation to the node at which they were captured. For example, a map may be shown of the datapath of a device under test including the individual nodes making up the datapath and including potentially the origin node, at least one intermediate node, and a destination node. Still further, the map may be shown to include timing information so as to indicate the natural delay in transferring the data packet along the datapath by passing-through each individual node along the path. Color may be selectively used to aid in comprehension—a "same object over time" may be assigned a color to help a reader differentiate relationships between objects.

Thereby, a designer with minimal effort, expended time, and reduced costs may have an automated system and method for data pattern tracking and debugging of datapath failures.

Although this invention has been described in connection with specific forms and embodiments thereof, it will be appreciated that various modifications other than those discussed above may be resorted to without departure from the spirit or scope of the invention. For example, equivalent elements may be substituted for those specifically shown and described, certain features may be used independently of other features, and in certain cases, particular combinations of circuit design and implementation flows or processing steps may be reversed, interposed, or combined, all without departing from the spirit or scope of the invention as defined in the appended Claims.

What is being claimed is:

1. A method of profiling propagation of data packets in a testing system for debugging a circuit device under test comprising:

establishing the circuit device under test in the testing system, the circuit device having a plurality of components coupled to one another at a plurality of respective nodes, the circuit device under test defining at least one data path for transmission of a data packet flow through said plurality of components coupled to an origin node, a destination node, and at least one intermediate node therebetween, the data packet flow traversing through each of said plurality of components in the at least one data path;

defining a characteristic data pattern of a target data packet payload and a set of anticipated transformations of the characteristic data pattern indicative of propagation of the target data packet payload through said plurality of components of the at least one data path;

acquiring a data pattern for a data packet payload at said destination node and the at least one intermediate node as the data packet payload is propagated through said plurality of components of the at least one data path;

executing a processor to search the acquired data patterns for a data pattern substantially matching the characteristic data pattern;

executing the processor to selectively capture a set of transformations of the substantially matching data pattern over said destination node and the at least one intermediate node of the least one data path, the selective capture being responsive to a comparison of the set of transformations of the substantially matching data pattern with respect to the set of anticipated transformations of the characteristic data pattern; and graphically displaying the captured data pattern from at least said destination node and the least one intermediate node.

2. The method as recited in claim 1, wherein the characteristic data pattern of the target data packet payload is identified based upon an error message related to the target data packet payload.

3. The method as recited in claim 1, wherein graphically displaying the captured data packet includes displaying timing information related to the captured data packet payload.

4. The method as recited in claim 1, wherein the testing system is executed to debug a representation of a device under test (DUT).

5. The method as recited in claim 1, wherein the data packet is captured through a fuzzy search according to the characteristic data pattern of the target data packet payload.

6. The method as recited in claim 1, wherein the data packet is captured through a fuzzy search according to the set of anticipated transformations of the characteristic data pattern of the target data packet payload.

7. The method as recited in claim 1, wherein the characteristic data pattern of the target data packet payload is identified according to a user's input.

8. The method as recited in claim 1, wherein the set of anticipated transformations of the characteristic data pattern of the target data packet payload is identified according to a user's input.

9. A method for a testing system of non-invasively tracking transformation of data packets propagating through a circuit device under test comprising:

establishing the circuit device under test in the testing system, the circuit device having a plurality of components coupled to one another at a plurality of respective nodes, the circuit device defining at least one data path for transmission of a data packet flow through said plurality of components coupled to an origin node, a destination node, and at least one intermediate node therebetween, the data packet flow traversing through each of said plurality of components in the at least one data path;

defining a characteristic data pattern of a target data packet payload and anticipated transformations of the characteristic data pattern indicative of propagation of the target data packet payload through said plurality of components of the at least one data path;

acquiring a data pattern for a data packet payload at said destination node and the at least one intermediate node as the data packet payload is propagated through said plurality of components of the at least one data path;

executing a processor to adaptively search the acquired data patterns for a data pattern substantially matching the characteristic data pattern to qualitatively identify a corresponding data packet payload as the target data packet payload; and, executing the processor to selectively capture a set of transformations of the substantially matching data pattern over at said destination node and the at least one intermediate node responsive to a comparison of the set of transformations of the substantially matching data pattern with respect to the anticipated transformations of the characteristic data pattern;

graphically displaying the data path and the captured data pattern of the data packet at each node along the least one data path including at least said destination node and the least one intermediate node.

10. The method as recited in claim 9, wherein the characteristic data pattern of the target data packet payload is identified based upon an error message related to the target data packet payload.

11. The method as recited in claim 9, wherein graphically displaying the least one data path and the captured data pattern of the data packet includes displaying timing information related to the captured data packet.

12. The method as recited in claim 9, wherein the testing system is executed to debug a representation of a device under test (DUT).

13. The method as recited in claim 9, wherein the data packet is identified through a fuzzy search according to the characteristic data pattern of the target data packet payload.

14. The method as recited in claim 9, wherein the data packet is identified through a fuzzy search according to the characteristic data pattern of the target data packet payload and a set of anticipated transformations of the characteristic data pattern of the target data packet payload.

15. The method as recited in claim 14, wherein the set of anticipated transformations of the characteristic data pattern of the target data packet payload is identified according to a user's input.

16. The method as recited in claim 9, wherein the characteristic data pattern of the target data packet payload is identified according to a user's input.

17. A system for profiling propagation of data packets in debugging through a circuit under test comprising:

a processor;

a storage memory coupled to the processor via a bus;

the circuit under test having a plurality of components coupled to one another at a plurality of respective nodes, the circuit under test defining a data path through said plurality of components coupled to an origin node and a destination node and at least one intermediate node disposed therebetween, a flow of the data packet traversing through each of said plurality of components in the data path;

a data pattern generator executing to generate an orthogonal characteristic data pattern and populate a target data packet payload according to the orthogonal characteristic data pattern;

a capture processing component executable to acquire a data pattern for a data packet payload at the destination node and the at least one intermediate node as the data packet payload is propagated through said plurality of components of the data path;

a search processing component executable to search the acquired data patterns for a data pattern substantially matching the characteristic data pattern for adaptively identifying the corresponding data packet payload as the target data packet payload;

the capture processing component executing to selectively capture a set of transformations of the substantially matching data patterns over the plural nodes along the data path including the destination node and the at least one of the intermediate nodes, the selective capture being responsive to a comparison of the transformations of the substantially matching data pattern with respect to thereof in substantial correspondence to anticipated transformations of the orthogonal characteristic data pattern indicative of propagation of the target data packet payload through said plurality of components; and a mapping module, operable to display the captured data patterns of the data packet payload occurring at each of the plurality of respective nodes along the data path.

18. The system as recited in claim 17, wherein the capture processing component is further operable to capture the data pattern of the data packet from an error message related to the captured data packet.

19. The system as recited in claim 17, wherein the mapping module is further operable to graphically display the data pattern of the data packet payload at each node along the data path correlated with timing information related to the data packet payload.

20. The system as recited in claim 17, wherein the circuit under test is a representation of a device under test (DUT) stored in a storage memory.

21. The system as recited in claim 17, wherein the search processing component employs a fuzzy search according to the data pattern of the data packet.

22. The system as recited in claim 17, wherein the search processing component employs a fuzzy search according to transformations of the data pattern of the data packet.

23. A system for profiling propagation of data packets through a data path in debugging a circuit device under test comprising:

the circuit device under test having a plurality of components coupled to one another at a plurality of respective nodes, the circuit device under test defining at least one data path through plurality of components coupled to an origin node, a destination node, and at least one intermediate node therebetween, a flow of the data packet traversing through each of said plurality of components in the at least one data path;

a capture processing component executable to acquire a data pattern for a data packet payload at the destination node and the at least one intermediate node as the data packet payload is propagated through said plurality of components of the at least one data path;

a search processing component executable to search the acquired data patterns for a data pattern substantially matching a characteristic data pattern of a target data packet payload, a set of anticipated transformations of the characteristic data pattern being predefined, the set of anticipated transformations being indicative of propagation of the target data packet payload through said plurality of components of the at least one data path;

the capture processing component executing to selectively capture a set of transformations of the substantially matching data pattern over the destination node and the at least one the intermediate node, the selective capture being responsive to a comparison of the transformations of the substantially matching data pattern with respect to the set of anticipated transformations of the characteristic data pattern; and a mapping module, operable to graphically display the data packet payload captured from at least the destination node and the at least one intermediate node.

* * * * *